(12) United States Patent
Sinha et al.

(10) Patent No.: US 10,896,263 B2
(45) Date of Patent: Jan. 19, 2021

(54) METHOD AND SYSTEM FOR SECURELY CONTROLLING ACCESS TO DATA

(71) Applicant: MASTERCARD INTERNATIONAL INCORPORATED, Purchase, NY (US)

(72) Inventors: Advait Sinha, London (GB); Syed Aamir Ahmad, London (GB); Raghav Malik, London (GB)

(73) Assignee: Mastercard International Incorporated, Purchase, NY (US)

(*) Notice: Subject to any disclaimer, the term of this patent is extended or adjusted under 35 U.S.C. 154(b) by 169 days.

(21) Appl. No.: 16/168,481

(22) Filed: Oct. 23, 2018

(65) Prior Publication Data

US 2019/0121999 A1 Apr. 25, 2019

(30) Foreign Application Priority Data

Oct. 24, 2017 (EP) .................................... 17198019

(51) Int. Cl.
*G06F 21/62* (2013.01)
*G06F 21/60* (2013.01)
(Continued)

(52) U.S. Cl.
CPC ........ *G06F 21/6227* (2013.01); *G06F 21/604* (2013.01); *G06F 21/6245* (2013.01);
(Continued)

(58) Field of Classification Search
CPC ............... G06F 21/6227; G06F 21/604; G06F 21/6245; G06F 2221/2107;
(Continued)

(56) References Cited

U.S. PATENT DOCUMENTS 8,265,595 B1 9/2012 Reeves et al.
9,819,673 B1 * 11/2017 Johansson ............... H04L 63/18
(Continued)

OTHER PUBLICATIONS

Sun et al., Secure Web 2.0 Content Sharing Beyond Walled Gardens, Dec. 2009, Annual Computer Security Applications Conference, pp. 409-418 (Year: 2009).*

(Continued)

*Primary Examiner* — Kenneth W Chang
(74) *Attorney, Agent, or Firm* — Loza & Loza, LLP (57) ABSTRACT

A computer-implemented method of securely controlling access to data, the method including a consolidation server creating and securely storing a consolidated file labelled by a user device ID, including a first record including a first app ID and a first account ID, and a second record including a second app ID and a second account ID, transmitting encrypted data, including the consolidated file, to the user device, receiving encrypted data indicating a request to modify the first record from the user device, and responsive thereto, modifying the first record according to the request to modify the first record and securely storing a resulting modified first record, and transmitting to the first issuer server encrypted data, including the first app ID and the first account ID, indicating an instruction to modify the first app's access rights to data relating to the first account according to the request.

16 Claims, 4 Drawing Sheets

(51) Int. Cl.
  *H04L 29/06* (2006.01)
  *H04L 29/08* (2006.01)
(52) U.S. Cl.
  CPC ...... *G06F 21/6272* (2013.01); *H04L 63/0428* (2013.01); *H04L 63/0876* (2013.01); *H04L 63/102* (2013.01); *H04L 67/06* (2013.01); *G06F 2221/2107* (2013.01); *G06F 2221/2141* (2013.01)
(58) Field of Classification Search
  CPC ......... G06F 2221/2141; H04L 63/0428; H04L 63/0876; H04L 63/102; H04L 67/06
  See application file for complete search history.

(56) References Cited

U.S. PATENT DOCUMENTS

| | | |
|---|---|---|
| 2004/0260948 A1 | 12/2004 | Miyata et al. |
| 2013/0086670 A1* | 4/2013 | Vangpat ............... H04L 63/102 726/8 |
| 2013/0191883 A1* | 7/2013 | Tung ...................... H04L 63/10 726/4 |
| 2015/0254467 A1* | 9/2015 | Leuthardt ............. G06F 21/606 726/28 |
| 2015/0339482 A1* | 11/2015 | Wurster ................ G06F 21/629 726/30 |
| 2016/0014131 A1* | 1/2016 | Neafsey ............ H04W 12/0802 713/171 |

OTHER PUBLICATIONS

European Extended Search Report, Application No. 17198019.6, dated Mar. 21, 2018, 8 pps.

Yajin Zhou et al.: "Taming Information-Stealing Smartphone Applications (on Android)" In: "ECCV 2016 conference", Jan. 1, 2011, Springer International Publishing, Cham 032548, XP055273036, ISSN: 0302-9743, ISBN: 978-3-642-33485-6, vol. 6740, pp. 93-107.

* cited by examiner

METHOD AND SYSTEM FOR SECURELY CONTROLLING ACCESS TO DATA

CROSS REFERENCE TO RELATED APPLICATIONS

This patent application claims priority to European Patent Application No. 17198019.6 filed on Oct. 24, 2017, the disclosure of which is incorporated by reference herein in its entirety as part of the present application.

BACKGROUND

The present disclosure relates to securely controlling access to data.

More specifically, aspects relate to a computer-implemented method of securely controlling access to data, a server for performing said method and a system including multiple servers.

The holders of accounts which store sensitive data are becoming increasingly familiar with web interfaces and applications (apps) for accessing their account data and account management services. They are also becoming accustomed to granting access to their personal data to app providers as part of the procedure for downloading a new app. However, the extent to which account holders are willing to grant access to this data to app providers often depends on their view of the trustworthiness of that provider, as well as the sensitivity of the data in question.

Account holders' views of app providers can also change over time, for example in response to increased familiarity with a particular provider or press coverage of a data breach. This can result in account holders wishing to grant more access rights, limit access rights or revoke access rights to particular providers.

Presently, some apps permit modification of account access rights via an in-app interface. However, the locations of such interfaces varies between apps, and if an account holder wishes to modify access rights granted to multiple apps at a time, they must access each in-app interface individually. This is time-consuming and can result in a large quantity of messages being transmitted across telecommunication networks, using up bandwidth as well as the battery power of the user's device.

What is needed is a way of simplifying the procedure for modifying access rights to accounts granted to apps, while maintaining data security.

BRIEF DESCRIPTION

A first aspect of the present disclosure provides a computer-implemented method of securely controlling access to data, the method including a consolidation server receiving, from a first issuer server, first encrypted data including a user device identifier (ID), a first application (app) ID for a first app stored on the user device, and a first account ID for an account issued by the first issuer, indicating authorization for the first app to access data relating to the first account, receiving, from a second issuer server, second encrypted data including the user device ID, a second app ID for a second app stored on the user device, and a second account ID for an account issued by the second issuer, indicating authorization for the second app to access data relating to the second account, creating and securely storing a consolidated file labelled by the user device ID, including a first record including the first app ID and the first account ID, and a second record including the second app ID and the second account ID, transmitting third encrypted data, including the consolidated file, to the user device, receiving fourth encrypted data, including the user device ID, the first app ID and the first account ID, indicating a request to modify the first record from the user device, and responsive thereto: modifying the first record according to the request to modify the first record and securely storing a resulting modified first record, and transmitting to the first issuer server fifth encrypted data, including the first app ID and the first account ID, indicating an instruction to modify the first app's access rights to data relating to the first account according to the request.

The method can further include, before receiving the fourth encrypted data, receiving sixth encrypted data, including the user device ID, indicating a request to register with an access rights consolidation service, from the user device.

The fourth and sixth encrypted data can originate from an app provided by the consolidation server's operator on the user device.

A second aspect of the present disclosure provides a consolidation server including a processor, a transmitter communicatively coupled to the processor, a receiver communicatively coupled to the processor, and a memory communicatively coupled to the processor and storing instructions which, when executed by the processor, cause the consolidation server to perform the method of the first aspect.

A third aspect of the present disclosure provides a computer-readable medium including instructions which, when executed by a processor, cause the computer to perform the method of the first aspect.

The method of the first aspect can further include the first issuer server receiving the fifth encrypted data, and responsive thereto, transmitting seventh encrypted data, including the account ID, indicating a modification notification to a server of a provider of the first app.

The method can further include the first issuer server prior to the consolidation server receiving the first encrypted data, receiving eighth encrypted data, including the first account ID and the first app ID, indicating authorization for the first app to access data relating to the first account, from the user device, and responsive thereto, transmitting the first encrypted data to the consolidation server.

The method can further include the first issuer server between receiving the eighth encrypted data and receiving the fifth encrypted data, transmitting ninth encrypted data, including data related to the first account, to the server of the provider of the first app.

The method can further include the first issuer server prior to receiving the eighth encrypted data, transmitting tenth encrypted data, including the account ID and the app ID, indicating a request for the eighth encrypted data, to the user device.

The method can further include the first issuer server: prior to transmitting the tenth encrypted data, receiving eleventh encrypted data, including the user device ID, the account ID, and the app ID, indicating an account-related data access request from the server of the provider of the first app.

A fourth aspect of the present disclosure provides a system including the consolidation server of the second aspect and a first issuer server, the first issuer server including a processor, a transmitter communicatively coupled to the processor, a receiver communicatively coupled to the processor, and a memory communicatively coupled to the processor and storing instructions which, when executed by the processor, cause the first issuer server to perform the method steps of the first aspect indicated above as being performed by the first issuer server.

A fifth aspect of the present disclosure provides a computer-readable medium including instructions which, when executed by a processor, cause the computer to perform the method steps of the first aspect indicated above as being performed by the first issuer server.

One or more of the first to eleventh encrypted data can be transmitted by means of an application programming interface (API) call.

The first and second issuers can be the same issuer.

The first and second accounts can be the same account.

BRIEF DESCRIPTION OF THE DRAWINGS

Aspects of the present disclosure will now be described by way of example with reference to the accompanying figures. In the figures.

DETAILED DESCRIPTION

The following description is presented to enable any person skilled in the art to make and use the system, and is provided in the context of a particular application. Various modifications to the disclosed embodiments will be readily apparent to those skilled in the art.

A method and system is provided in which a consolidation server securely consolidates access rights granted by an account holder (user) to multiple apps on their user device. The account holder can then manage these access rights centrally through the consolidation server in a time-, bandwidth- and power-efficient manner.

Figure 1:
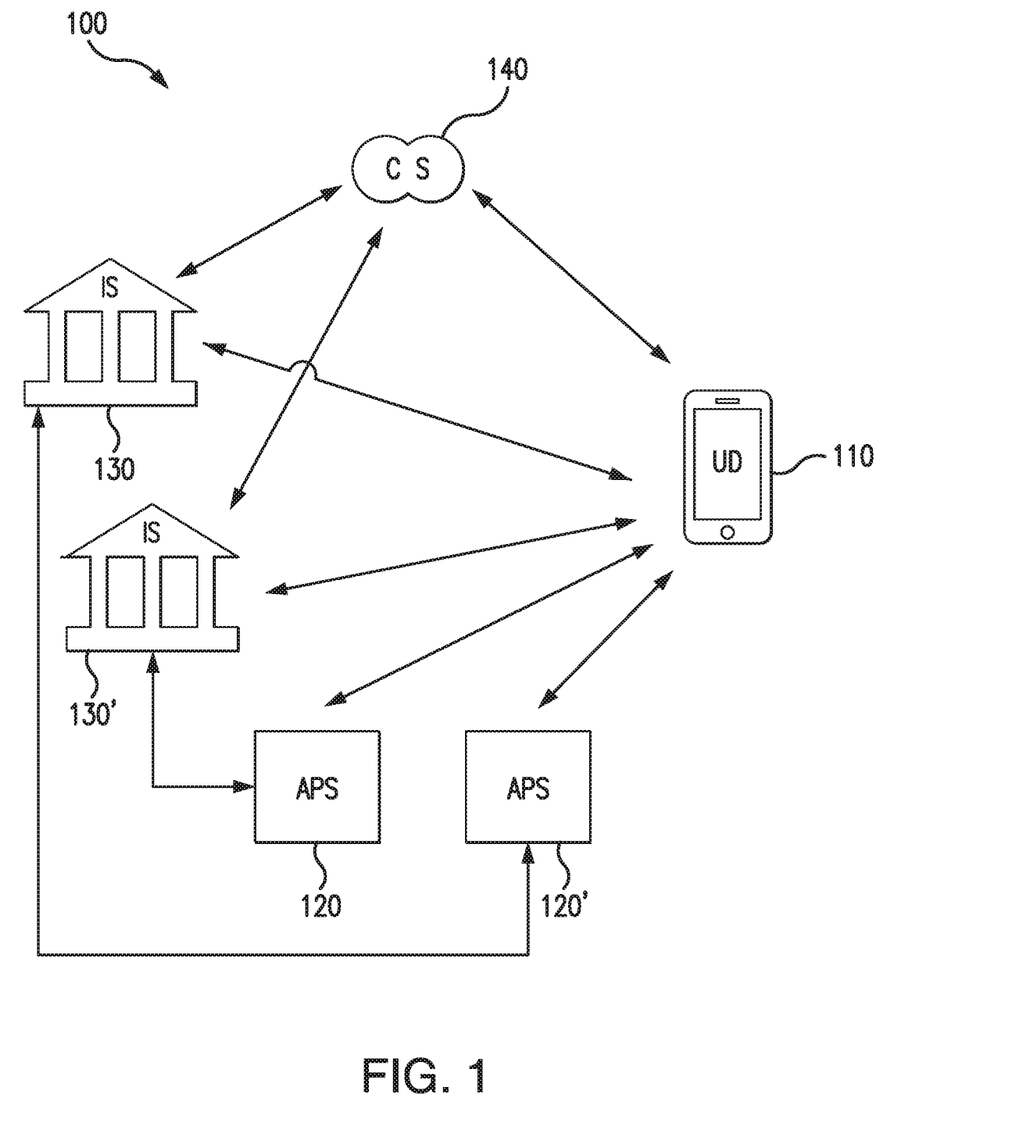
FIG. 1 schematically illustrates an example system.

FIG. 1 schematically illustrates an example system 100 including a user device (UD) 110, a first app provider server (APS) 120, a second app provider server (APS) 120', a first issuer server (IS) 130, a second issuer server (IS) 130' and a consolidation server (CS) 140.

The first APS 120 provides a first app stored on the UD 110. The first app requires access to data relating to a first account of the user of the UD 110 stored on the first IS 130. The first IS 130 is operated by the issuer of the first account.

The second APS 120' provides a second app stored on the UD 110. The second app requires access to data relating to a second account of the user of the UD 110 stored on the second IS 130'. The second IS 130' is operated by the issuer of the second account.

User authorization for their account data to be shared with the APS 120 and the APS 120' is provided by means of communication between the UD 110, the application provider server(s) in question, and the relevant IS(s).

The CS 140 securely stores a consolidated file recording the access rights granted to the first and second apps. The UD 110 can communicate with the CS 140 in order to modify those access rights. The CS can achieve this through communication with the IS 130 and/or the IS 130'.

One or more of the communication links illustrated by the arrows in FIG. 1 can be provided by means of an application programming interface (API).

FIG. 1 shows only one user device, two application provider servers, and two issuer servers in order to illustrate the system clearly. The system could however include any number of each, depending on the number of users subscribed to the consolidation service, the number of user devices registered by each user, the number of apps stored on each user device for which account data is required, the number of accounts held by each user and the number of issuers of those accounts. Each APS may provide one or more apps stored on the UD 110. Each IS may store account data for one or more accounts held by the user of the UD 110. Each app stored on the UD 110 may require access to account data relating to one or more accounts and stored on one or more issuer servers. Each account holder may have one or more user devices, one or more of which may be linked in to the system shown in FIG. 1.

Figure 2:
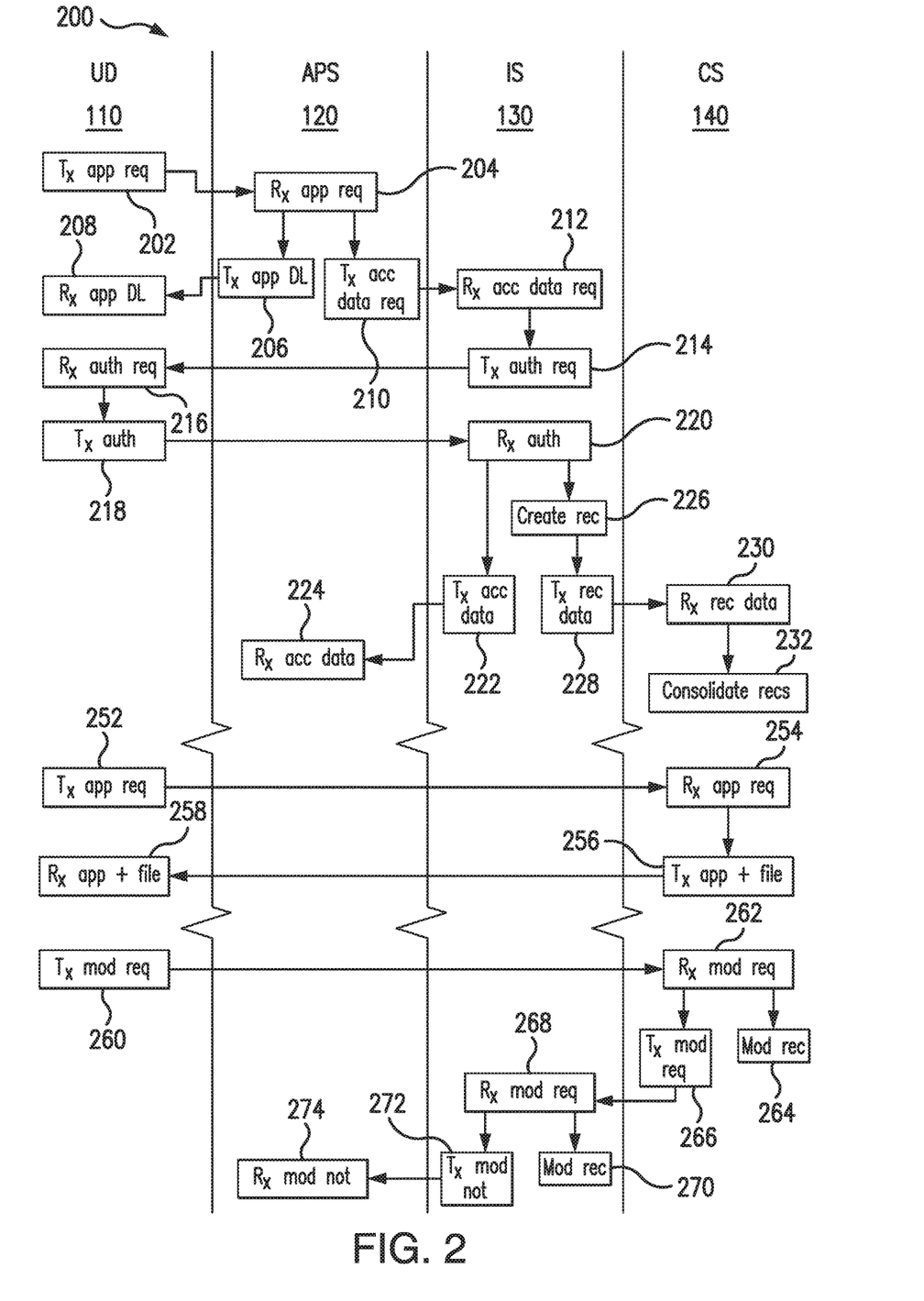
FIG. 2 is a flowchart illustrating an example method.

FIG. 2 is a flowchart illustrating an example method 200 which could be used in the system of FIG. 1.

Throughout this method, account data is protected by means of encrypting messages between entities, and storing the data securely.

Where identifiers are referred to, it is to be understood that it is not required for every entity to transmit and receive exactly the same identifier (ID), so long as the data transmitted and received allows the recipient to correctly identify the item referred to. For example, a user device might be identified by a number of different UD IDs; e.g. a user might provide an APS with their mobile telephone number, while their user device might be identified in an IS database by its international mobile subscriber identity (IMSI) number. This is acceptable providing that the recipient of either kind of UD ID has access (either locally or via communication with a remote machine) to a correspondence table which allows them to match mobile telephone numbers with IMSI numbers.

Steps 202 to 232 illustrate an example of how a new app can be downloaded onto a user device and a database securely stored on a consolidation server updated accordingly. In this example the new app is provided by the APS 120 shown in FIG. 1 and the account data the new app requires is stored on the IS 130. Steps 202 to 232 could be repeated for each new app download however.

At step 202 the UD 110 requests a new application download from an APS 120. This request includes a UD ID in order to allow the APS 120 to direct their response to the correct user device. In response to the APS 120 receiving the request at step 204, it transmits an app download to the UD 110, where it is received at step 208.

In the example shown, the request received by the APS 120 at step 204 includes an account ID so, in response to receipt of the request at step 204, at step 210 the APS 120 transmits an account data request to an issuer server 130. This request includes the UD ID and account ID, as well as an app ID. If the request received at step 204 does not include the account ID then this can be separately requested and received by the APS 120 before the account data request is issued at step 210.

In response to receipt of the account data request at step 212, at step 214 the IS 130 transmits an authorization request to the UD 110. The authorization request includes the account ID and the app ID. In response to receipt of the authorization request at step 216, the UD 110 transmits an authorization to the IS 130 at step 218. Optionally, one or more of the account data request, authorization request, and authorization can contain details of exactly which types, categories or ranges of account data the new app is permitted access to.

In response to receipt of the authorization at step 220, the IS 130 transmits the relevant permitted account data to the APS 120 at step 222, where it is received at step 224.

Also in response to receipt of the authorization at step 220, the IS 130 creates a new record at step 226 including the UD ID, the app ID, and the account ID. Data relating to this record (at least the UD ID, the app ID, and the account ID) is then transmitted to the consolidation server 140 at step 228. In response to receipt of the record data at step 230, the CS 140 creates and securely stores its own record, including the UD ID, the app ID, and the account ID, in a consolidated file with all other records relating to the UD 110 at step 232. If no consolidated file yet exists for the UD 110, then step 232 also includes creating a new file including the new record, in which future records relating to the UD 110 will be stored.

Steps 252 to 274 illustrate an example of how a user can modify the access rights provided to one or more apps on their device. To simplify the flowchart, only a single APS 120 and IS 130 are shown. However, this approach allows account holders to modify access rights of multiple apps to multiple accounts with a single request.

In this example, the first stage is to provide the user with access to the consolidation server's app, as illustrated by steps 252 to 258. At step 252 the UD 110 transmits a request to download the consolidation server's app, together with the UD ID. In response to receipt of this request at step 254, the CS 140 transmits the app to the UD 110, as well as the consolidated file for that particular user device 110. These are received at step 258, allowing the user to review the access permissions they have granted. Alternatively, communication between the UD 110 and the CS 140 could be established by other means than through an app, for example through a web service or via in person customer service interaction.

If the user desires modification of any of the access requests, either immediately or at a later time, they cause the UD 110 to transmit a modification request to the CS 140 at step 260. The modification request includes the UD ID and at least one set of app ID, account ID, and access modification instruction. In this example, it includes the app ID for the app provided by the APS 120 together with the account ID for the account stored on the IS 130 and an instruction to revoke all access rights. It could for example include an app ID for an app provided by the APS 120' together with an account ID for an account stored on the IS 130' and an instruction to extend access rights to incorporate a further category of account data. In response to receipt of the modification request at step 262, the CS 140 modifies and securely stores the appropriate record(s) at step 264.

Also in response to receipt of the modification request at step 262, the CS 140 relays the relevant part of the modification request (i.e. the app ID, modification instruction, and account ID for all referenced accounts whose data is stored on the IS 130) to the IS 130 at step 266. In response to receipt of the modification request at step 268, the IS 130 modifies its own record(s) as appropriate at step 270.

Also in response to receipt of the modification request at step 268, the IS 130 transmits a modification notification including the account ID to the APS 120, where it is received at step 274.

Figure 3:
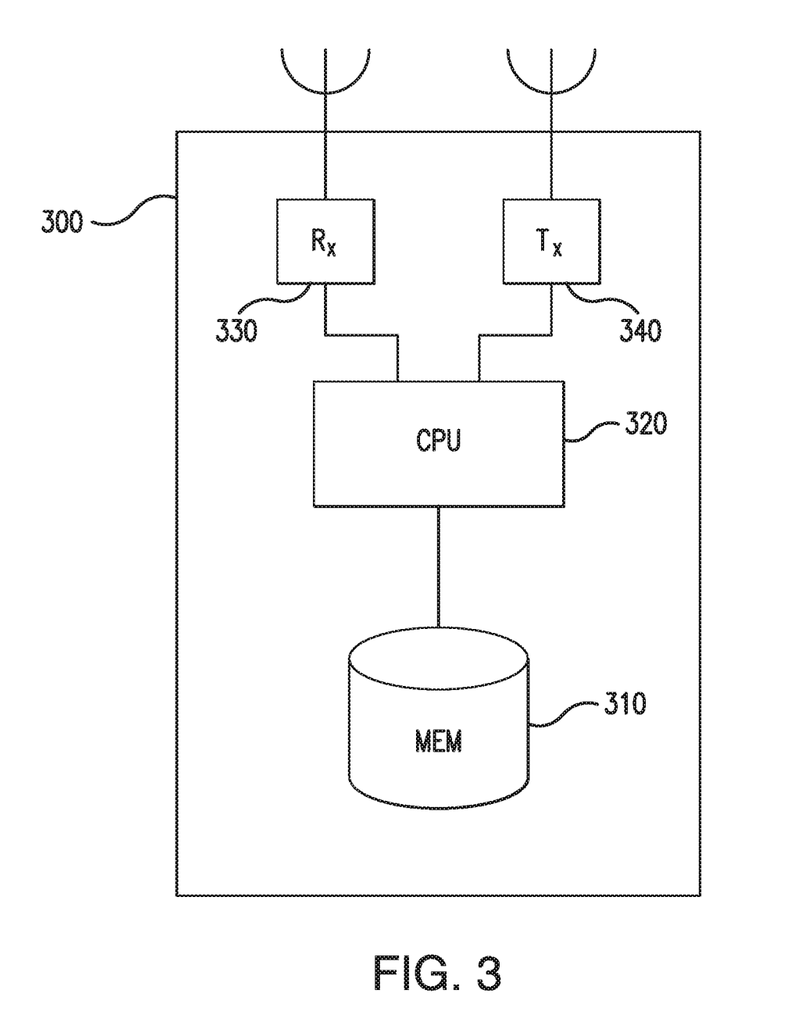
FIG. 3 schematically illustrates an example computer system.

FIG. 3 is a schematic diagram illustrating an example computer system 300 which could perform steps of the methods described herein. A memory 310 is communicatively coupled to a processor 320. The memory 310 stores instructions for execution by the processor 320 and data obtained (e.g. received or generated) by the processor 320. The processor 320 is communicatively coupled to a receiver 330 and a transmitter 340. The receiver 330 and the transmitter 340 may be included in a single transceiver unit, and may share resources, such an antenna.

Figure 4:
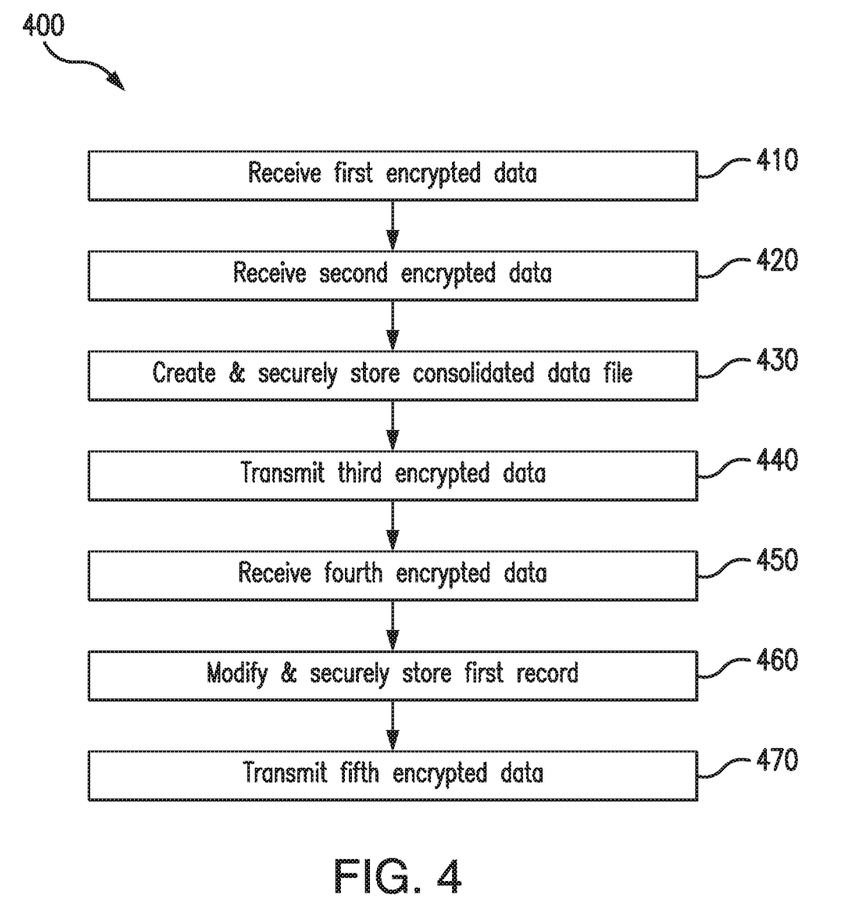
FIG. 4 is a flowchart illustrating an example method performed by a consolidation server.

FIG. 4 is a flowchart illustrating an example method 400 performed by a consolidation server.

At step 410, first encrypted data is received from a first issuer server. The first encrypted data includes a user device ID, a first app ID for a first app stored on the user device, and a first account ID for an account issued by the first issuer. The first encrypted data indicates authorization for the first app to access data relating to the first account.

At step 420, second encrypted data is received from a second issuer server. The second encrypted data includes the user device ID, a second app ID for a second app stored on the user device, and a second account ID for an account issued by the second issuer. The second encrypted data indicates authorization for the second app to access data relating to the first account.

At step 430 a consolidated file is created and securely stored. The consolidated file is labelled by the user device ID and includes a first record including the first app ID and the first account ID and a second record including the second app ID and the second account ID.

At step 440 third encrypted data, including the consolidated file, is transmitted to the user device.

At step 450 fourth encrypted data, including the first app ID and the first account ID, indicating a request to modify the first record, is received from the user device.

Responsive thereto, at step 460 the first record is modified according to the request to modify the first record and a resulting modified first record is securely stored.

At step 470 fifth encrypted data, including the first app ID and the first account ID, indicating an instruction to modify the first app's access rights to data relating to the first account according to the request, is transmitted to the first issuer server.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

User devices can include, without limitation, static user devices such as PCs and mobile user devices such as smartphones, tablets, laptops, and smartwatches.

Receivers and transmitters as described herein may be standalone or may be included in transceivers. A communication link as described herein includes at least one transmitter capable of transmitting data to at least one receiver over one or more wired or wireless communication channels. Such a communication link may further include one or more relaying transceivers.

User input devices can include, without limitation, microphones, buttons, keypads, touchscreens, touchpads, trackballs, joysticks, and mice. User output devices can include, without limitation, speakers, graphical user interfaces, indicator lights, and refreshable braille displays. User interface devices can include one or more user input devices, one or more user output devices, or both.

What is claimed is:

1. A computer-implemented method of securely controlling access to data, the method performed using a consolidation server, the method comprising:
   receiving, from a first issuer server, first encrypted data comprising a user device identifier (ID), a first application (app) ID for a first app stored on a user device, and a first account ID for a first account issued by a first issuer, indicating authorization for the first app to access data relating to the first account;
   receiving, from a second issuer server, second encrypted data comprising the user device ID, a second app ID for a second app stored on the user device, and a second account ID for a second account issued by a second issuer, indicating authorization for the second app to access data relating to the second account;
   creating and securely storing a consolidated file labelled by the user device ID, the consolidated file comprising:
   a first record comprising the first app ID and the first account ID; and
   a second record comprising the second app ID and the second account ID;
   transmitting third encrypted data, comprising the consolidated file, to the user device; and
   receiving fourth encrypted data, comprising the user device ID, the first app ID, and the first account ID, indicating a request to modify the first record from the user device.

2. The method according to claim 1, further comprising, before receiving the fourth encrypted data, receiving sixth encrypted data, comprising the user device ID, indicating a request to register with an access rights consolidation service, from the user device.

3. The method according to claim 2, wherein the fourth and sixth encrypted data originates from an app provided by an operator of the consolidation server on the user device.

4. The method according to claim 1, wherein one or more of the first encrypted data, the second encrypted data, the third encrypted data, and the fourth encrypted data are transmitted by means of an application programming interface (API) call.

5. The method according to claim 1, wherein the first issuer and the second issuer are the same issuer.

6. The method according to claim 5, wherein the first account and the second account are the same account.

7. The method according to claim 1, wherein response to receiving the fourth encrypted data, the method further comprising:
   modifying the first record according to the request to modify the first record and securely storing a resulting modified first record; and
   transmitting to the first issuer server fifth encrypted data, comprising the first app ID and the first account ID, indicating an instruction to modify access rights for the first app to data relating to the first account according to the request.

8. The method according to claim 7, further comprising:
   receiving, by the first issuer server, the fifth encrypted data; and responsive thereto, transmitting, by the first issuer server, seventh encrypted data, comprising the first account ID, indicating a modification notification to a server of a provider of the first app.

9. The method according to claim 8, further comprising:
   prior to the consolidation server receiving the first encrypted data, receiving, by the first issuer server, eighth encrypted data, comprising the first account ID and the first app ID, indicating authorization for the first app to access data relating to the first account, from the user device; and
   responsive thereto, transmitting, by the first issuer server, the first encrypted data to the consolidation server.

10. The method according to claim 9, further comprising:
    between receiving the eighth encrypted data and receiving the fifth encrypted data, transmitting, by the first issuer server, ninth encrypted data, comprising data related to the first account, to the server of the provider of the first app.

11. The method according to claim 9, further comprising:
    prior to receiving the eighth encrypted data, transmitting, by the first issuer server, tenth encrypted data, comprising the first account ID and the first app ID, indicating a request for the eighth encrypted data, to the user device.

12. The method according to claim 11, further comprising:
prior to transmitting the tenth encrypted data, receiving, by the first issuer server, eleventh encrypted data, comprising the user device ID, the first account ID and the first app ID, indicating an account-related data access request from the server of the provider of the first app.

13. A consolidation server comprising:
a processor;
a transmitter communicatively coupled to the processor;
a receiver communicatively coupled to the processor, and
a memory communicatively coupled to the processor and storing instructions which, when executed by the processor, cause the consolidation server to
receive, from a first issuer server, first encrypted data comprising a user device identifier (ID), a first application (app) ID for a first app stored on a user device, and a first account ID for a first account issued by a first issuer, indicating authorization for the first app to access data relating to the first account;
receive, from a second issuer server, second encrypted data comprising the user device ID, a second app ID for a second app stored on the user device, and a second account ID for a second account issued by a second issuer, indicating authorization for the second app to access data relating to the second account;
create and securely store a consolidated file labelled by the user device ID, the consolidated file comprising:
a first record comprising the first app ID and the first account ID; and
a second record comprising the second app ID and the second account ID;
transmit third encrypted data, comprising the consolidated file, to the user device; and
receive fourth encrypted data, comprising the user device ID, the first app ID, and the first account ID, indicating a request to modify the first record from the user device.

14. The consolidation server according to claim 13, wherein the memory stores further instructions which, in response to receiving the fourth encrypted data, cause the consolidation server to
modify the first record according to the request to modify the first record and securely storing a resulting modified first record; and
transmit to the first issuer server fifth encrypted data, comprising the first app ID and the first account ID, indicating an instruction to modify access rights for the first app to data relating to the first account according to the request.

15. A non-transitory computer-readable storage medium having instructions stored thereon for securely controlling access to data in a consolidation server, which when executed by one or more processors, cause the one or more processors to:
receive, from a first issuer server, first encrypted data comprising a user device identifier (ID), a first application (app) ID for a first app stored on a user device, and a first account ID for a first account issued by a first issuer, indicating authorization for the first app to access data relating to the first account;
receive, from a second issuer server, second encrypted data comprising the user device ID, a second app ID for a second app stored on the user device, and a second account ID for a second account issued by a second issuer, indicating authorization for the second app to access data relating to the second account;
create and securely store a consolidated file labelled by the user device ID, the consolidated file comprising:
a first record comprising the first app ID and the first account ID; and
a second record comprising the second app ID and the second account ID;
transmit third encrypted data, comprising the consolidated file, to the user device; and
receive fourth encrypted data, comprising the user device ID, the first app ID, and the first account ID, indicating a request to modify the first record from the user device.

16. The non-transitory computer-readable storage medium according to claim 15, having further instructions stored thereon, which when executed by one or more processors, cause the one or more processors to:
modify the first record, in response to receiving the fourth encrypted data, according to the request to modify the first record and securely storing a resulting modified first record; and
transmit to the first issuer server fifth encrypted data, comprising the first app ID and the first account ID, indicating an instruction to modify access rights for the first app to data relating to the first account according to the request.

* * * * *